(12) United States Patent
Zhao et al.

(10) Patent No.: US 10,924,756 B2
(45) Date of Patent: Feb. 16, 2021

(54) DEVICES AND METHODS FOR VIDEO CODING USING SEGMENTATION BASED PARTITIONING OF VIDEO CODING BLOCKS

(71) Applicant: Huawei Technologies Co., Ltd., Shenzhen (CN)

(72) Inventors: Zhijie Zhao, Munich (DE); Max Blaeser, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/227,249

(22) Filed: Dec. 20, 2018

(65) Prior Publication Data
US 2019/0124355 A1  Apr. 25, 2019

Related U.S. Application Data

(63) Continuation of application No. PCT/EP2016/064708, filed on Jun. 24, 2016.

(51) Int. Cl.
*H04N 19/52* (2014.01)
*H04N 19/105* (2014.01)
(Continued)

(52) U.S. Cl.
CPC .......... *H04N 19/52* (2014.11); *H04N 19/105* (2014.11); *H04N 19/119* (2014.11);
(Continued)

(58) Field of Classification Search
CPC ...... H04N 19/52; H04N 19/105; H04N 5/145; H04N 19/51
(Continued)

(56) References Cited

U.S. PATENT DOCUMENTS 8,861,593 B2   10/2014  Liu
2009/0116759 A1*  5/2009  Suzuki .................. H04N 19/61
382/238
(Continued)

FOREIGN PATENT DOCUMENTS

CN    103385004 A    11/2013
CN    103765474 A    4/2014
(Continued)

OTHER PUBLICATIONS

"Series H: Audiovisual and Multimedia Systems Infrastructure of audiovisual services—Coding of moving video Advanced video coding for generic audiovisual services," ITU-T H.264, pp. 1-807, International Union of Telecommunication—Geneva, Switzerland (Feb. 2016).
(Continued)

*Primary Examiner* — Jeffery A Williams
(74) *Attorney, Agent, or Firm* — Leydig, Voit & Mayer, Ltd.

(57) ABSTRACT

Embodiments of the disclosure relate to an encoding apparatus and a decoding apparatus. The encoding apparatus is configured to process a video signal, the video signal comprising a plurality of frames, each frame being dividable into a plurality of video coding blocks, each video coding block comprising a plurality of pixels. The encoding apparatus comprises a partitioner configured to partition a first video coding block of the plurality of video coding blocks of a first frame of the video signal into a first segment and a second segment, wherein the first segment comprises a first set of the plurality of pixels of the first video coding block and the second segment comprises a second set of the plurality of pixels of the first video coding block.

13 Claims, 9 Drawing Sheets

(51) Int. Cl.
  H04N 5/14       (2006.01)
  H04N 19/51      (2014.01)
  H04N 19/176     (2014.01)
  H04N 19/463     (2014.01)
  H04N 19/567     (2014.01)
  H04N 19/91      (2014.01)
  H04N 19/119     (2014.01)
  H04N 19/70      (2014.01)
  H04N 19/147     (2014.01)
  H04N 19/182     (2014.01)
  H04N 19/65      (2014.01)
  H04N 19/13      (2014.01)
  H04N 19/117     (2014.01)
  H04N 19/86      (2014.01)

(52) U.S. Cl.
  CPC ......... *H04N 19/147* (2014.11); *H04N 19/176* (2014.11); *H04N 19/182* (2014.11); *H04N 19/463* (2014.11); *H04N 19/567* (2014.11); *H04N 19/65* (2014.11); *H04N 19/70* (2014.11); *H04N 19/91* (2014.11); *H04N 19/117* (2014.11); *H04N 19/13* (2014.11); *H04N 19/86* (2014.11)

(58) Field of Classification Search
  USPC ..................................................... 375/240.16
  See application file for complete search history.

(56) References Cited

U.S. PATENT DOCUMENTS

| | | | |
|---|---|---|---|
| 2011/0200109 | A1 | 8/2011 | Joshi et al. |
| 2011/0261886 | A1* | 10/2011 | Suzuki .................. H04N 19/56 375/240.16 |
| 2012/0177106 | A1 | 7/2012 | Divorra Escoda et al. |
| 2012/0236929 | A1 | 9/2012 | Liu |
| 2013/0101039 | A1 | 4/2013 | Florencio et al. |
| 2016/0286232 | A1* | 9/2016 | Li .......................... H04N 19/46 |

FOREIGN PATENT DOCUMENTS

| | | |
|---|---|---|
| CN | 104025591 A | 9/2014 |
| EP | 2680588 A1 | 1/2014 |
| EP | 2775716 A1 | 9/2014 |
| EP | 2704441 B1 | 9/2015 |
| WO | 2008016605 A2 | 2/2008 |
| WO | 2008150113 A1 | 12/2008 |
| WO | 2009051719 A2 | 4/2009 |
| WO | 2011103213 A2 | 8/2011 |
| WO | 2011127819 A1 | 10/2011 |
| WO | 2013032423 A1 | 3/2013 |
| WO | 2013068562 A1 | 5/2013 |
| WO | 2013068564 A1 | 5/2013 |
| WO | 2013068566 A1 | 5/2013 |
| WO | 2013165808 A1 | 11/2013 |
| WO | 2015007348 A1 | 1/2015 |
| WO | 2015139762 A1 | 9/2015 |

OTHER PUBLICATIONS

Jaeger et al,"Simplified Depth-based Block Partitioning and Prediction Merging in 3D Video Coding," IEEE, pp. 1-4, Institute of Electrical and Electronics Engineers—New York, New York (2014).

Sullivan et al,"Overview of the High Efficiency Video Coding (HEVC) Standard," IEEE Transactions on Circuits and Systems for Video Technology, vol. 22, No. 12, pp. 1-20, Institute of Electrical and Electronics Engineers—New York, New York (Dec. 12, 2012).

Chen et al,"Object Boundary Based Motion Partition for Video Coding," Picture Coding Symposium, pp. 1-4, Institute of Electrical and Electronics Engineers—New York, New York (2007).

Kondo et al, "A Motion Compensation Technique Using Sliced Blocks in Hybrid Video Coding," IEEE International Conference on Image Processing 2005, pp. 1-4, Institute of Electrical and Electronics Engineers—New York, New York (Nov. 14, 2005).

Escoda et al, "Geometry-Adaptive Block Partitioning for Video Coding." IEEE International Conference on Acoustics, Speech and Signal Processing—ICASSP, pp. 1-4, Institute of Electrical and Electronics Engineers—New York, New York (Jun. 4, 2007).

Mathew et al, "Joint Scalable Modeling of Motion and Boundary Geometry with Quad-Tree Node Merging," 2009 16th IEEE International Conference on Image Processing (ICIP), pp. 1-4, Institute of Electrical and Electronics Engineers—New York, New York (Feb. 17, 2010).

Guo et al, "Simplified geometry-adaptive block partitioning for video coding," 2010 IEEE International Conference on Image Processing, pp. 1-4, Institute of Electrical and Electronics Engineers—New York, New York (Dec. 3, 2010).

Wang et al, "Complexity-Reduced Geometry Partition Search and High Efficiency Prediction for Video Coding," IEEE International Symposium on Circuits and Systems, pp. 1-4, Institute of Electrical and Electronics Engineers—New York, New York (Aug. 20, 2012).

Wang et al, "Complexity Reduction and Performance Improvement for Geometry Partitioning in Video Coding," IEEE Transactions on Circuits and Systems for Video Technology, vol. 23, No. 2, pp. 1-15, Institute of Electrical and Electronics Engineers—New York, New York (Feb. 2013).

Otsu, "A Threshold Selection Method from Gray-Level Histograms." IEEE Transactions on Systrems, Man, and Cyber Netics, vol. SMC-9, No., pp. 1-5, Institute of Electrical and Electronics Engineers—New York, New York (Jan. 1, 1979).

Achanta et al, "SLIC Superpixels Compared to State-of-the-Art Superpixel Methods," IEEE Transactions on Pattern Analysis and Machine Intelligence, vol. 34, No. 11, pp. 1-8, Institute of Electrical and Electronics Engineers—New York, New York (Nov. 2012).

Maji et al, "Biased Normalized Cuts," Computer Vision and Pattern Recognition (CVPR), 2011 IEEE Conference on , vol., No., pp. 2057-2064, Institute of Electrical and Electronics Engineers—New York, New York (Jun. 20-25, 2011).

Karczewicz et al, "Video coding technology proposal by Qualcomm Inc." Joint Collaborative Team on Video Coding (JCT-VC) of ITU-T SG16 WP3 and ISO/IEC JTC1/SC29/WG11 1st Meeting: Dresden, DE, JCTVC-A121, pp. 1-24, International Union of Telecommunication—Geneva, Switzerland (Apr. 15-23, 2010).

Zheng et al, "Flexible macroblock partition for inter-frame coding," Joint Collaborative Team on Video Coding (JCT-VC) of ITU-T SG16 WP3 and ISO/IEC JTC1/SC29/WG11 1st Meeting: Dresden, DE, JCTVC-A029, pp. 1-4, International Union of Telecommunication—Geneva, Switzerland (Apr. 15-23, 2010).

Guo et al, "TE 3: Simplified Geometry Block Partitioning," Joint Collaborative Team on Video Coding (JCT-VC) of ITU-T SG16 WP3 and ISO/IEC JTC1/SC29/WG11 2nd Meeting: Geneva, CH, JCTVC-B085, pp. 1-5, International Union of Telecommunication—Geneva, Switzerland (Jul. 21-28, 2010).

Francois et al, "CE2: Summary of Core Experiment 2 on Flexible Motion Partitioning," Joint Collaborative Team on Video Coding (JCT-VC) of ITU-T SG16 WP3 and ISO/IEC JTC1/SC29/WG11 4rd Meeting: Daegu, KR, JCTVC-D229r1, m18989, pp. 1-7, International Union of Telecommunication—Geneva, Switzerland (Jan. 20-28, 2011).

Borders et al, "CE2: Unified solution of flexible motion partitioning," Joint Collaborative Team on Video Coding (JCT-VC) of ITU-T SG16 WP3 and ISO/IEC JTC1/SC29/WG11 5th Meeting: Geneva, CH, JCTVC-E374, pp. 1-3, International Union of Telecommunication—Geneva, Switzerland (Mar. 16-23, 2011).

Zheng et al, "CE2: Non-rectangular motion partitioning," Joint Collaborative Team on Video Coding (JCT-VC) of ITU-T SG16 WP3 and ISO/IEC JTC1/SC29/WG11 6th Meeting: Torino, IT, JCTVC-F415, pp. 1-2, International Union of Telecommunication—Geneva, Switzerland (Jul. 14-22, 2011).

Boyce, "BoG report on CE2: Motion partitioning and OBMC," Joint Collaborative Team on Video Coding (JCT-VC) of ITU-T SG16 WP3 and ISO/IEC JTC1/SC29/WG11 6th Meeting: Torino,

(56) References Cited

OTHER PUBLICATIONS

IT, JCTVC-F751, pp. 1, International Union of Telecommunication—Geneva, Switzerland (Jul. 14-22, 2011).

Zheng et al, "CE2: Summary report of core experiment on Motion Partitioning and OBMC," Joint Collaborative Team on Video Coding (JCT-VC) of ITU-T SG16 WP3 and ISO/IEC JTC1/SC29/WG11 7th Meeting: Geneva, CH, JCTVC-G032, pp. 1-16, International Union of Telecommunication—Geneva, Switzerland (Nov. 21-30, 2011).

Chan et al., "Variable Size Block Matching Motion Compensation with Applications to Video Coding," IEEE Proceedings, vol. 137, No. 4, XP000147601, pp. 205-212, Institute of Electrical and Electronics Engineers, New York, New York (Aug. 1990).

EP/16731918, Office Action, dated May 27, 2020.

Jäger et al., "CE3: Results on Depth-based Block Partitioning (DBBP),", Joint Collaborative Team on 3D Video Coding Extensions of ITU-T SG 16 WP 3 and ISO/IEC JTC 1/SC 29/WG 11, JCT3V-G0106, 7th Meeting, San Jose, USA, pp. 1-12, International Telecommunication Union, Geneva, Switzerland (Jan. 11-17, 2013).

Jäger et al., "Encoder optimization: Motion estimation for DBBP with masked SAD instead of SATD," Joint Collaborative Team on 3D Video Coding Extensions of ITU-T SG 16 WP 3 and ISO/IEC JTC 1/SC 29/WG 11, JCT3V-K0028, 11th Meeting, Geneva, CH, pp. 1-3, International Telecommunication Union, Geneva, Switzerland (Feb. 12-18, 2015).

Lin et al., "Removal of the decoder-side DBBP partition derivation process," Joint Collaborative Team on 3D Video Coding Extensions of ITU-T SG 16 WP 3 and ISO/IEC JTC 1/SC 29/WG 11, JCT3V-I0097, 9th Meeting, Sapporo, JP, pp. 1-7, International Telecommunication Union, Geneva, Switzerland (Jul. 3-9, 2014).

\* cited by examiner

DEVICES AND METHODS FOR VIDEO CODING USING SEGMENTATION BASED PARTITIONING OF VIDEO CODING BLOCKS

CROSS-REFERENCE TO RELATED APPLICATIONS

This application is a continuation of International Application No. PCT/EP2016/064708, filed on Jun. 24, 2016, the disclosure of which is hereby incorporated by reference in its entirety.

TECHNICAL FIELD

Generally, embodiments of the present invention relate to the field of video coding. More specifically, embodiments of the present invention relate to an encoding apparatus and a decoding apparatus for processing a video signal using segmentation based partitioning of video coding blocks.

BACKGROUND

In current video coding schemes, such as H.264/AVC ("Advanced Video Coding") or HEVC ("High Efficiency Video Coding"), the motion information in inter-predicted pictures (also referred to as frames) is partitioned into rectangular video coding blocks of configurable size. While in H.264/AVC the motion is partitioned into symmetric video coding blocks with a maximum size of 16×16 pixels, so-called macroblocks, which can be further subdivided down to a minimum of 4×4 pixels, HEVC replaces a macroblock with a coding tree unit (CTU) of maximum size 64×64 pixels. The CTU is not just a larger macroblock, as it can be partitioned in a quadtree (QT) decomposition scheme into smaller coding units (CU), which, in turn, can be subdivided down to a minimum size of 8×8 pixels. Furthermore, in comparison to H.264/AVC additionally HEVC supports asymmetric block partitioning (AMP) of coding units (CU) into prediction units (PU).

The determination of the decomposition and partitioning of each CTU is performed during the encoding process and is based on a rate-distortion optimization criterion. While AMP already provides an improved coding efficiency, problems in coding efficiency may arise along the boundaries of moving objects in a video sequence. Object boundaries that are not strictly vertical or horizontal may result in a fine quadtree decomposition and block partitioning along the object boundary. As the blocks along the boundary are expected to contain similar motion information, redundancy is introduced, which decreases the coding efficiency.

An attempt to address this problem is called geometric motion partitioning (GMP), which is based on the idea of partitioning a rectangular video coding block into two segments via a straight line, which can have practically any orientation. This approach provides for more flexibility in motion partitioning and therefore leads to a closer approximation of the actual motion. However, finding the optimal GMP of a video coding block in an exhaustive search, which greatly increases the computational complexity. Moreover, an efficient predictive coding scheme for the additional GMP information has to be provided.

In a more general and advanced partitioning approach, the video coding block containing an object boundary is partitioned into two (or more) segments along the actual object boundary, where the two or more segments carry coherent, yet different motion information. Due to the possible complexity of the shape of the boundary, coding the boundary and transmitting it as side information to the decoder is generally not an efficient option in terms of the data rate. This problem can be solved by determining the object boundary at the decoder (and encoder) side using already available information, e.g. from available reference pictures. Finding the correct object boundary is a typical problem in the field of image segmentation. Segmentation can be performed according to numerous image features, such as pixel luminance, chrominance, texture or a combination thereof.

An example for a segmentation based partitioning approach in the context of H.264/AVC is disclosed in WO2008150113. A reference block is used for obtaining the partition of a current block through coding of an additional motion vector.

WO2013165808 extends the segmentation based partitioning approach for video coding to scalable video coding.

WO2015007348 relates to depth based block partitioning (DBBP), which is used, for instance, as a coding tool in the 3D extensions of HEVC, and discloses the use of a depth map at the co-located position of a video coding block instead of a reference picture to obtain the appropriate segmentation.

Although the conventional approaches described above already provide some improvements compared to other prior art approaches, there is still a need for improved devices and methods for video coding using segmentation based partitioning of video coding blocks.

SUMMARY

It is an object of the invention to provide improved devices and methods for video coding using segmentation based partitioning of video coding blocks.

The foregoing and other objects are achieved by the subject matter of the independent claims. Further implementation forms are apparent from the dependent claims, the description and the figures.

In order to describe the invention in detail, the following terms, abbreviations and notations will be used:

| | |
|---|---|
| HEVC | High-Efficiency Video Coding |
| CU | Coding Unit |
| CTU | Coding Tree Unit |
| PU | Prediction Unit |
| PB | Prediction Block |
| MV | Motion Vector |
| GMP | Geometric Motion Partitioning |
| SBP | Segmentation Based Partitioning |
| AMP | Asymmetric Motion Partitioning |

As used herein, a video signal or video sequence is a set of subsequent frames presenting a motion picture. In other words, a video signal or video sequence consists of a plurality of frames (also referred to as pictures).

As used herein, segmentation is the process of partitioning a picture or picture region, in particular a video coding block, into two or more segments.

As used herein, coding tree unit (CTU) denotes the root of a coding structure of the video sequence of a pre-defined size, containing a part of a frame (e.g. 64×64 pixels). A CTU can be partitioned into several CUs.

As used herein, coding unit (CU) denotes a basic coding structure of the video sequence of a pre-defined size, containing a part of a frame, which is belonging to a CTU. A CU can be partitioned into further CUs.

As used herein, prediction unit (PU) denotes a coding structure, which is the result of partitioning of a CU.

As used herein, the term co-located in the present document denotes a block or region in a second frame, i.e. a reference frame, corresponding to an actual block or region in a first frame, i.e. a current frame.

According to a first aspect the invention relates to an encoding apparatus for processing a video signal, wherein the video signal comprises a plurality of frames, each frame being dividable into a plurality of video coding blocks and each video coding block comprising a plurality of pixels. The encoding apparatus comprises a partitioner configured to partition a first video coding block of the plurality of video coding blocks of a currently processed first frame of the video signal into at least a first segment and a second segment, wherein the first segment comprises a first set of the plurality of pixels of the first video coding block and the second segment comprises a second complimentary set of the plurality of pixels of the first video coding block, a determiner configured to determine a position of the first segment in a co-located block in a second frame, in particular a reference frame, of the video signal on the basis of at least some of the plurality of pixels of the first video coding block, for instance on the basis of the intensity values of at least some of the plurality of pixels of the first video coding block, and at least one extension region in the second frame of the video signal, wherein the extension region neighbors the co-located block in the second frame. The encoding apparatus further include an encoding processor configured to code coding information of the first video coding block and side information of the extension region on the basis of the position of the first segment in the second frame of the video signal, the coding information including at least one of prediction error and motion information.

Thus, an improved encoding apparatus for video coding is provided using segmentation based partitioning of video coding blocks. The present invention is based on the general idea of extending the sampling region of a currently processed video coding block by using additional samples, i.e. pixels from an extension region defined by neighboring video coding blocks. On the basis of this larger sampling space the position of the segments can be estimated more precisely. This is especially advantageous, when the currently processed video coding block is of small size and represents a moving scene, so that the segmented portion cannot be correctly estimated based on the information of the segment.

In a first possible implementation form of the encoding apparatus according to the first aspect as such, the extension region is a subset of one or more video coding blocks neighboring the co-located video coding block in the second frame.

In a second possible implementation form of the encoding apparatus according to the first implementation form of the first aspect, the extension region is frame-shaped, wherein the determiner is configured to adjust an extension region width of the extension region on the basis of the size of the first video coding block.

In a third possible implementation form of the encoding apparatus according to the second implementation form of the first aspect, the determiner is configured to increase the extension region width in case the number of pixels of the first video coding block decreases.

In a fourth possible implementation form of the encoding apparatus according to the third implementation form of the first aspect, the determiner is configured to adjust the extension region width to 16 pixels in case the first video coding block comprises 32×32 pixels or to adjust the extension region width to 8 pixels in case the first video coding block comprises 64×64 pixels.

In a fifth possible implementation form of the encoding apparatus according to the third implementation form of the first aspect, the determiner is configured to adjust the extension region width to 16 pixels in case the first video coding block comprises 8×8 pixels or to adjust the extension region width to 8 pixels in case the first video coding block comprises 16×16 pixels.

In a sixth possible implementation form of the encoding apparatus according to any one of the first to fifth implementation form of the first aspect, the determiner is configured to determine the position of the first segment in the second frame of the video signal on the basis of at least some of the plurality of pixels of the first video coding block sampled using a first sampling density and at least some of a plurality of pixels of the extension region using a second sampling density, wherein the first sampling density and/or the second sampling density depends on the size of the first video coding block. In an implementation form, the first sampling density can be equal to the second sampling density.

In a seventh possible implementation form of the encoding apparatus according to the sixth implementation form of the first aspect, the determiner is configured to increase the first sampling density in case the number of pixels of the first video coding block decreases.

In an eighth possible implementation form of the encoding apparatus according to the sixth or seventh implementation form of the first aspect, the first sampling density is larger than the second sampling density.

In a ninth possible implementation form of the encoding apparatus according to the first aspect as such or any one of the preceding implementation forms thereof, the processor is configured to encode the first video coding block on the basis of the position of the first segment in the second frame of the video signal along with information about the at least one pixel of the extension region.

In a further possible implementation form of the encoding apparatus according to the first aspect as such or any one of the preceding implementation forms thereof, the determiner is further configured to preprocess the plurality of pixels of the plurality of neighboring video coding blocks, in particular by using a low pass or median filter.

In a further possible implementation form of the encoding apparatus according to the first aspect as such or any one of the preceding implementation forms thereof the side information includes at least one of a shape of the extension region, a size of the extension region and a sampling pattern, said side information being received on one of a coding block level, slice level, picture level and sequence level.

In a still possible implementation form of the encoding apparatus, the side information is context based adaptive binary arithmetic coded, the context being defined by side information of at least one neighboring block.

According to a second aspect the invention relates to a decoding apparatus for processing a video signal, the video signal comprising a plurality of frames, each frame being dividable into a plurality of video coding blocks, each video coding block comprising a plurality of pixels. The decoding apparatus comprises a decoding processor configured to decode coding information of a first video coding block in a current frame and side information of an extension region of a co-located block in a reference frame of the video signal, the extension region neighboring the co-located block in the reference frame. The decoding apparatus further includes a partitioner configured to partition the co-located video coding block in the reference frame into a first segment and a second segment, wherein the first segment comprises a first set of the plurality of pixels of the co-located video coding block and the second segment comprises a second complimentary set of the plurality of pixels of the co-located video coding block based on the received, i.e. decoded coding information and side information; and a reconstruction unit configured to reconstruct the first video coding block based on the decoded coding information, the first segment and second segment in the reference frame.

In a first possible implementation form of the decoding apparatus according to the second aspect as such, the extension region is a subset of one or more video coding blocks neighboring the co-located video coding block in the second frame.

In a second possible implementation form of the decoding apparatus according to the first implementation form of the second aspect, the extension region is frame-shaped, wherein an extension region width of the extension region depends on the size of the first video coding block.

In a third possible implementation form of the decoding apparatus according to the second implementation form of the second aspect, the extension region width increases in case the number of pixels of the first video coding block decreases.

In a fourth possible implementation form of the decoding apparatus according to the third implementation form of the second aspect, the extension region width is 16 pixels in case the first video coding block comprises 32×32 pixels or the extension region width is 8 pixels in case the first video coding block comprises 64×64 pixels.

In a fifth possible implementation form of the decoding apparatus according to the third implementation form of the second aspect, the extension region width is adjusted to 16 pixels in case the first video coding block comprises 8×8 pixels or to 8 pixels in case the first video coding block comprises 16×16 pixels.

In a sixth possible implementation form of the decoding apparatus according to the second aspect as such or any one of the preceding implementation forms thereof the side information includes at least one of a shape of the extension region, a size of the extension region and a sampling pattern, said side information being received on one of a coding block level, slice level, picture level and sequence level.

In a seventh possible implementation form of the decoding apparatus according to the sixth implementation form of the second aspect, the side information is context based adaptive binary arithmetic coded, the context being defined by side information of at least one neighboring block.

According to a third aspect the invention relates to a method for processing a video signal, the video signal comprising a plurality of frames, each frame being dividable into a plurality of video coding blocks, each video coding block comprising a plurality of pixels. The method comprises the steps of partitioning a first video coding block of the plurality of video coding blocks of a first frame of the video signal into at least a first segment and a second segment, wherein the first segment comprises a first set of the plurality of pixels of the first video coding block and the second segment comprises a second complimentary set of the plurality of pixels of the first video coding block; determining the position of the first segment or the second segment in a second frame, in particular a reference frame, of the video signal on the basis of the intensity values of at least some of the plurality of pixels of the first video coding block and at least one extension region in the second frame of the video signal, wherein the extension region neighbors the co-located block in the second frame; and coding information of the first video coding block and side information of the extension region on the basis of the position of the first segment in the second frame of the video signal, the coding information including at least one of prediction error and motion information.

In a first possible implementation form of the method according to the third aspect as such, the extension region is a subset of one or more video coding blocks neighboring the co-located video coding block in the second frame.

In a second possible implementation form of the method according to the third implementation form of the first aspect, the extension region is frame-shaped, wherein the extension region width of the extension region is adjusted on the basis of the size of the first video coding block.

In a third possible implementation form of the method according to the second implementation form of the third aspect, the extension region width is increased in case the number of pixels of the first video coding block decreases.

In a fourth possible implementation form of the method according to the third implementation form of the third aspect, the extension region width is adjusted to 16 pixels in case the first video coding block comprises 32×32 pixels or to 8 pixels in case the first video coding block comprises 64×64 pixels.

In a fifth possible implementation form of the method according to the third implementation form of the third aspect, the extension region width is adjusted to 16 pixels in case the first video coding block comprises 8×8 pixels or to adjust the extension region width to 8 pixels in case the first video coding block comprises 16×16 pixels.

In a sixth possible implementation form of the method according to any one of the first to fifth implementation form of the first aspect, the position of the first segment in the second frame of the video signal is determined on the basis of at least some of the plurality of pixels of the first video coding block sampled using a first sampling density and at least some of a plurality of pixels of the extension region using a second sampling density, wherein the first sampling density and/or the second sampling density depends on the size of the first video coding block. In an implementation form, the first sampling density can be equal to the second sampling density.

In a seventh possible implementation form of method according to the sixth implementation form of the third aspect, the first sampling density is increased in case the number of pixels of the first video coding block decreases.

In an eighth possible implementation form of the method according to the sixth or seventh implementation form of the third aspect, the first sampling density is larger than the second sampling density.

In a ninth possible implementation form of the method according to the third aspect as such or any one of the preceding implementation forms thereof, the first video coding block is encoded on the basis of the position of the first segment in the second frame of the video signal along with information about the at least one pixel of the extension region.

In a further possible implementation form of the method according to the third aspect as such or any one of the preceding implementation forms thereof, the plurality of pixels of the plurality of neighboring video coding blocks are preprocessed, in particular by using a low pass or median filter.

In a further possible implementation form of the method according to the third aspect as such or any one of the preceding implementation forms thereof the side information includes at least one of a shape of the extension region, a size of the extension region and a sampling pattern, said side information being received on one of a coding block level, slice level, picture level and sequence level.

In a still possible implementation form of method according to the third aspect as such or any one of the preceding implementation forms thereof, the side information is context based adaptive binary arithmetic coded, the context being defined by side information of at least one neighboring block.

The method according to the third aspect of the invention can be performed by the encoding apparatus according to the first aspect of the invention. Further features and implementation forms of the method according to the third aspect of the invention result directly from the functionality of the encoding apparatus according to the first aspect of the invention and its different implementation forms.

According to a fourth aspect the invention relates to a method for processing a video signal, the video signal comprising a plurality of frames, each frame being dividable into a plurality of video coding blocks, each video coding block comprising a plurality of pixels. The method comprises decoding coding information of a first video coding block of the plurality of video coding blocks in a current frame and side information of an extension region of a co-located block in a reference frame of the video signal, the extension region neighboring the co-located block in the reference frame. The co-located video coding block in the reference frame is partitioned into a first segment and a second segment based on the decoded coding information and side information, wherein the first segment comprises a first set of the plurality of pixels of the co-located video coding block and the second segment comprises a second set of the plurality of pixels of the co-located video coding block. The first video coding block is reconstructed based on the decoded coding information, the first segment and second segment in the reference frame.

In a first possible implementation form of method according to the fourth aspect as such, the extension region is a subset of one or more video coding blocks neighboring the co-located video coding block in the second frame.

In a second possible implementation form of the method according to the first implementation form of the fourth aspect, the extension region is frame-shaped, wherein an extension region width of the extension region depends on the size of the first video coding block.

In a third possible implementation form of the method according to the second implementation form of the fourth aspect, the extension region width increases in case the number of pixels of the first video coding block decreases.

In a fourth possible implementation form of the method according to the third implementation form of the fourth aspect, the extension region width is 16 pixels in case the first video coding block comprises 32×32 pixels or the extension region width is 8 pixels in case the first video coding block comprises 64×64 pixels.

In a fifth possible implementation form of the method according to the third implementation form of the fourth aspect, the extension region width is adjusted to 16 pixels in case the first video coding block comprises 8×8 pixels or to 8 pixels in case the first video coding block comprises 16×16 pixels.

In a sixth possible implementation form of the method according to the fourth aspect as such or any one of the preceding implementation forms thereof the side information includes at least one of a shape of the extension region, a size of the extension region and a sampling pattern, said side information being received on one of a coding block level, slice level, picture level and sequence level.

In a seventh possible implementation form of the method according to the sixth implementation form of the second aspect, the side information is context based adaptive binary arithmetic.

According to a fifth aspect the invention relates to a computer program comprising program code for performing the method according to the third aspect of the invention or any of its implementation forms when executed on a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1:
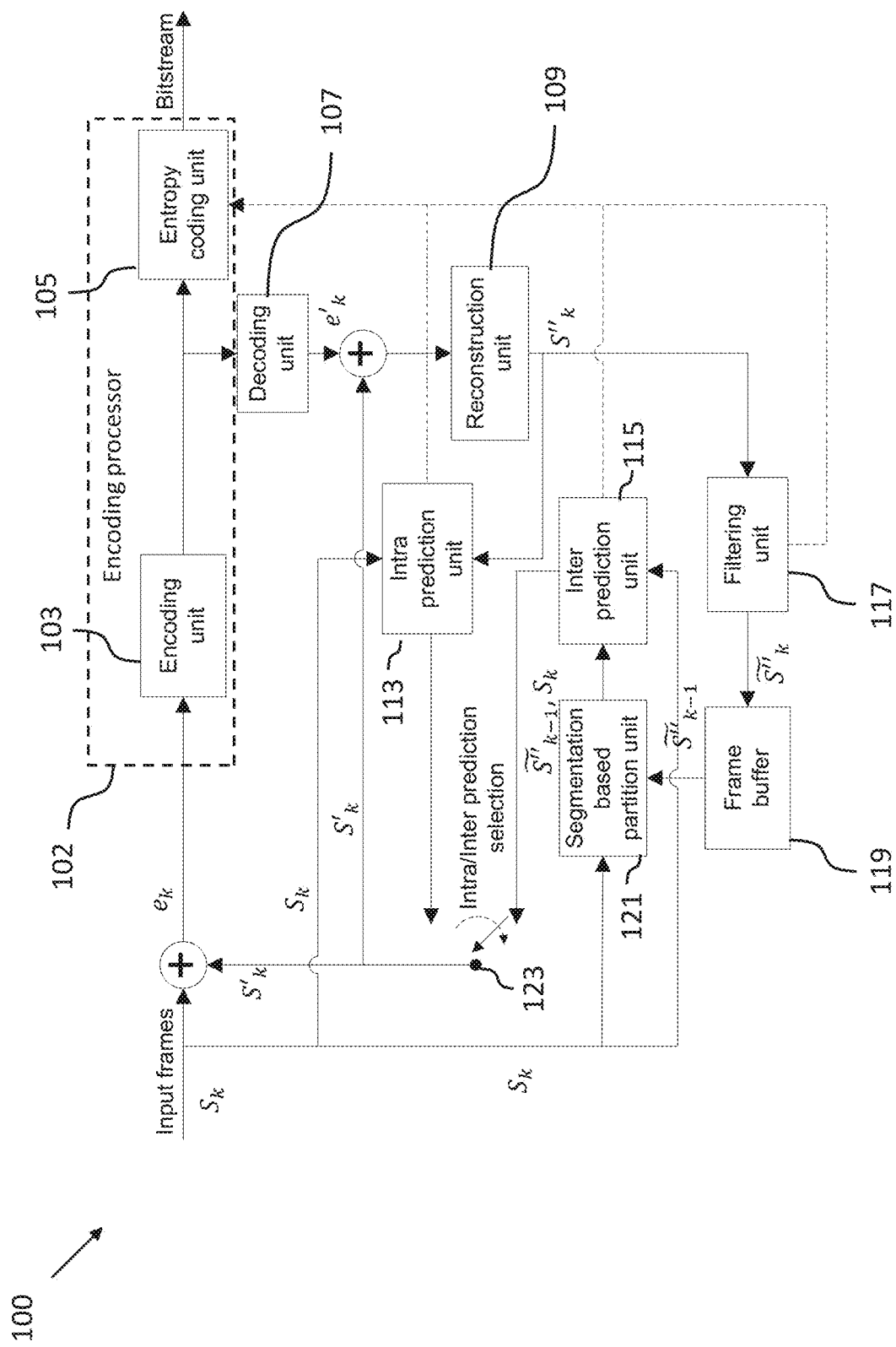
FIG. 1 shows a schematic diagram illustrating an encoding apparatus according to an embodiment.

FIG. 1 shows a schematic diagram illustrating an encoding apparatus 100 according to an embodiment. The encoding apparatus 100 is configured to process, in particular encode a video signal, wherein the video signal comprises a plurality of frames, each frame is dividable into a plurality of video coding blocks and each video coding block comprises a plurality of pixels.

The encoding apparatus 100 comprises a partitioner 121, which in the embodiment shown in FIG. 1 is implemented in the form of a segmentation based partition unit 121. Under further reference to FIG. 4, the partitioner 121 is configured to partition a first video coding block 403 of the plurality of video coding blocks of a first frame 405 of the video signal into a first segment 403a and a second segment 403b, wherein the first segment 403a comprises a first set of the plurality of pixels of the first video coding block 403 and the second segment 403b comprises a second set of the plurality of pixels of the first video coding block.

Furthermore, the encoding apparatus 100 comprises a determiner 115, which in the embodiment shown in FIG. 1 is implemented in the form of an inter prediction unit 115. The determiner 115 is configured to determine the position of the first segment 403a' in a co-located block 403' in a second frame 405' of the video signal on the basis of at least some of the plurality of pixels of the first video coding block 403 and at least one extension region 407' in the second frame 405' of the video signal, wherein the extension region 407' neighbors the co-located block 403' in the second frame 405'. The extension region may include one or more pixels.

Moreover, the encoding apparatus 100 comprises an encoding processor, which in the embodiment shown in FIG. 1 is implemented in the form of an encoding unit 103 and/or an entropy encoding unit 105. The processor is configured to code coding information of the first video coding block 403 and side information of the extension region 407' on the basis of the position of the first segment 403a' in the second frame 405' of the video signal.

The coding information of the first video coding block may include at least one of prediction error $e_k$ and motion information. The prediction error $e_k$ may be obtained as explained below in the further description of the encoder of FIG. 1. The motion information may include at least one of a block motion vector associated to the first video coding block 403, a first segment motion vector associated to the first segment 403a, a second segment motion vector associated to the second segment 403b and a boundary motion vector associated to the boundary between the first segment 403a and the second segment 403b. Instead of coding the complete motion vectors, the difference between the current and previous motion vector in the bit-stream may be encoded. This approach allows to exploit the redundancy between motion vectors of neighboring blocks.

Besides the above described features, the encoder illustrated in FIG. 1 further shows additional components as will be discussed below. Although these components may be present in a possible implementation of an encoder according to the invention, these are not essential relative to the inventive concepts discussed in this document.

In hybrid video coding the first frame of a video signal is generally an intra frame, which can be encoded using only intra prediction. An intra prediction unit 113 of the encoding apparatus 100 shown in FIG. 1 can perform the processes for intra prediction. An intra frame can be decoded without referencing information from other frames. The video coding blocks of the frames following the first frame can be inter or intra coded.

The inter prediction unit 115 of the encoding apparatus 100 shown in FIG. 1 can perform such operations as motion estimation, motion compensation for choosing motion data including the selected reference picture, motion vector, partitioning, mode decision and other information, as will be described in more detail further below in the context of FIG. 3.

As already mentioned above, the generally rectangular video coding blocks are partitioned by the segmentation based partition unit 121 into two or more respective segments having irregular (or arbitrary) shapes, namely a first segment comprising a first set of the plurality of pixels of the video coding block and a second segment comprising a second set of the plurality of pixels of the video coding block, which is complementary to the first set of the plurality of pixels of the video coding block. The first segment and the second segment define a boundary between each other.

The inter prediction unit 115 receives as input a reconstructed frame or second frame $S''_{k-1}$ (used as a reference frame) and the current or first frame $S_k$. In the implementation illustrated in FIG. 1, the reconstructed frame $S''_{k-1}$ may also be optionally filtered to obtain a filtered reconstructed frame $\widetilde{S''}_{k-1}$. The reconstructed frame $S''_{k-1}$ or the filtered reconstructed frame $\widetilde{S''}_{k-1}$ may be stored in a frame buffer 119 and used as reference frame for the motion compensated prediction performed in the inter prediction units or intra prediction units. In addition, the inter prediction unit 115 may further receive an input frame $S_k$. The input frame $S_k$ and the reconstructed frame $S''_{k-1}$ or the filtered reconstructed frame $\widetilde{S''}_{k-1}$ may be input to the inter prediction unit directly or through the segmentation based partition unit 121. In the following we will focus on the operation of the inter prediction unit 115. The inter prediction unit 115 performs motion compensated prediction for the current block 403 and/or for the segments in which the block has been segmented, for instance the first and second segments 403a and 403b. In particular, the inter prediction unit 115 may predict the motion vectors for at least one of the current block, for instance the bock 403, each of the segments 403a and 403b and the boundary between the first and the second segments in the current block 403.

In the embodiment shown in FIG. 1, the prediction error $e_k$ of the intra/inter picture prediction, which is the difference between the original video coding block of the input frame $S_k$ and a corresponding block in the predicted frame $S'_k$, is input to the encoding processor 102. The prediction error $e_k$ can be encoded by the encoding unit 103 of the encoding apparatus 100, which can perform such processes as transform, transform skip, scaling, quantization and the like. The output of the encoding unit 103 can be further encoded by the entropy coding unit 105 of the encoding apparatus 100. In addition to the output of the encoding unit 103, the entropy encoding unit may further receive additional prediction related information provided by the intra prediction unit 113, the inter prediction unit 115 and/or the filtering unit 117 (dashed lines in FIG. 1). The additional prediction related information may include the prediction mode, the size of the block being coded and the side information of the extension region. The side information of the extension region may include, for instance, at least one of a size of the extension region, location of the extension region and a sampling density of the extension region. With the term sampling density it is meant the number of sampling points per unit area in the extension region. The sampling points of the extension region may be for instance the pixels used for locating the first segment in the reference frame.

Although the description above only mentions an extension region 407' in the second frame (reference frame), the present invention may also be implemented so as to have an extension region also in the current frame. In this case the extension region 407' in the second frame can be indicated as reference extension region, while the extension region in the current frame (not shown in the figures) may be indicated as current extension region.

The current extension region can be defined as the reference extension region described above. In particular, the current extension region can be chosen to neighbor the first video coding block.

If the invention is implemented using the reference and current extension regions, the determiner 115, 115a may be configured to determine a position of the first segment 403a in the co-located block 403' in the second frame 405' of the video signal on the basis of at least some of the plurality of pixels of the first video coding block 403, at least one first extension region (the current extension region) and at least one second extension region 407' (the reference extension region) in the second frame 405' of the video signal; wherein the first extension region neighbors the first video coding block 403 and wherein the extension region 407' neighbors the co-located block 403' in the second frame 405'.

In the embodiment shown in FIG. 1, the encoding apparatus 100 duplicates the processing of a corresponding decoding apparatus 200, which will be described in more detail further below in the context of FIG. 2, such that both the encoding apparatus 100 and the decoding apparatus 200 will generate the same reconstructed prediction errors $e'_k$. The decoding unit 107 of the encoding apparatus 100 shown in FIG. 1 is configured to perform operations inverse to the operations of the encoding unit 103 and duplicates the decoded approximation of the prediction error/residual data $e_k$. The decoded prediction error/residual data $e'_k$ is then added to the results of the prediction $S'_k$. A reconstruction unit 109 of the encoding apparatus 100 obtains the results of adding the residual to the prediction. In other words, the reconstruction unit receives as input the sum of predicted frame $S'_k$ and the prediction error/residual data $e'_k$ and processes said input to obtain a reconstructed frame $S''_k$. The reconstructed frame $S''_k$ can be used as reference frame. In an embodiment, the output of the reconstruction unit 109, i.e. the reconstructed frame $S''_k$ can be further processed by one or more filters implemented in a filtering unit 117 to smooth any coding artifacts.

The final picture is stored in a frame buffer 119 of the encoding apparatus 100 and can be used for the prediction of subsequent frames of the video signal. The final picture may be the reconstructed frame $S''_k$ or the processed reconstructed frame $\widetilde{S''}_k$, wherein processing may include for instance the filtering performed by the filtering unit 117. In an embodiment, the segmentation based partition unit 121 can perform the steps of object boundary based partition including possible pre- and post-processing. The segmentation based partition unit 121 is configured to adaptively generate a segmentation for the current block from the reference pictures/frames. Segmentation related parameters can be encoded and transmitted as side-information to the decoding apparatus 200. As an example, side-information may be input from the segmentation based partition unit 121 to the inter prediction unit 115 and from the inter prediction unit 115 to the entropy coding unit 105 (dashed lines in FIG. 1). Alternatively, side-information may be input directly from the segmentation based partition unit 121 into the entropy coding unit 105 (not shown). The side-information may be then transmitted to a decoding apparatus 200 along with the encoded video signal. Alternatively, the side information may be coded in the video signal to be transmitted as bitstream to the decoding apparatus 200.

Figure 2:
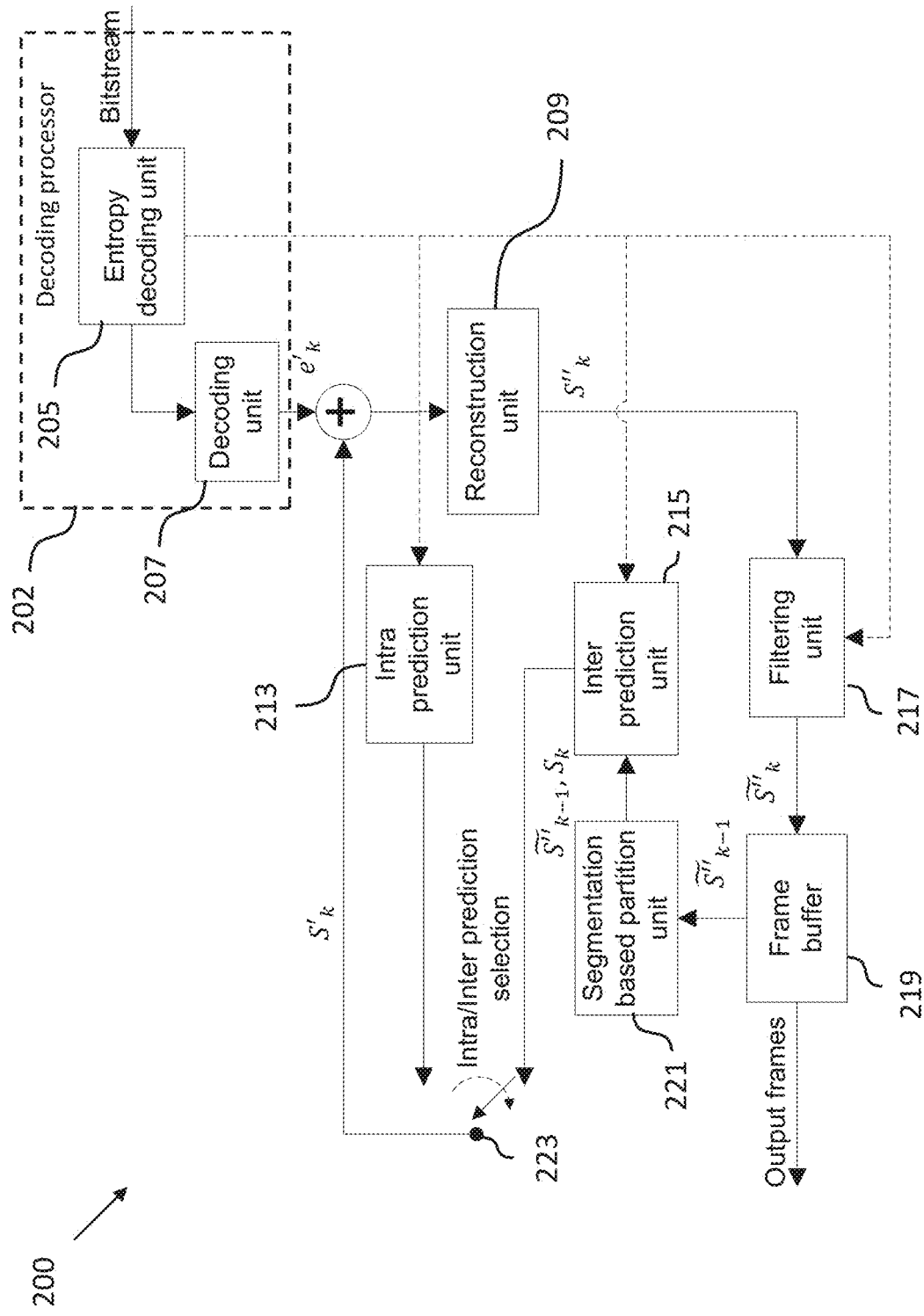
FIG. 2 shows a schematic diagram illustrating a decoding apparatus according to an embodiment.

FIG. 2 shows a schematic diagram illustrating the decoding apparatus 200 according to an embodiment. The decoding apparatus is configured to process a video signal, in particular a video signal encoded by the encoding apparatus 100 shown in FIG. 1 and transmitted as a bitstream.

Figure 4:
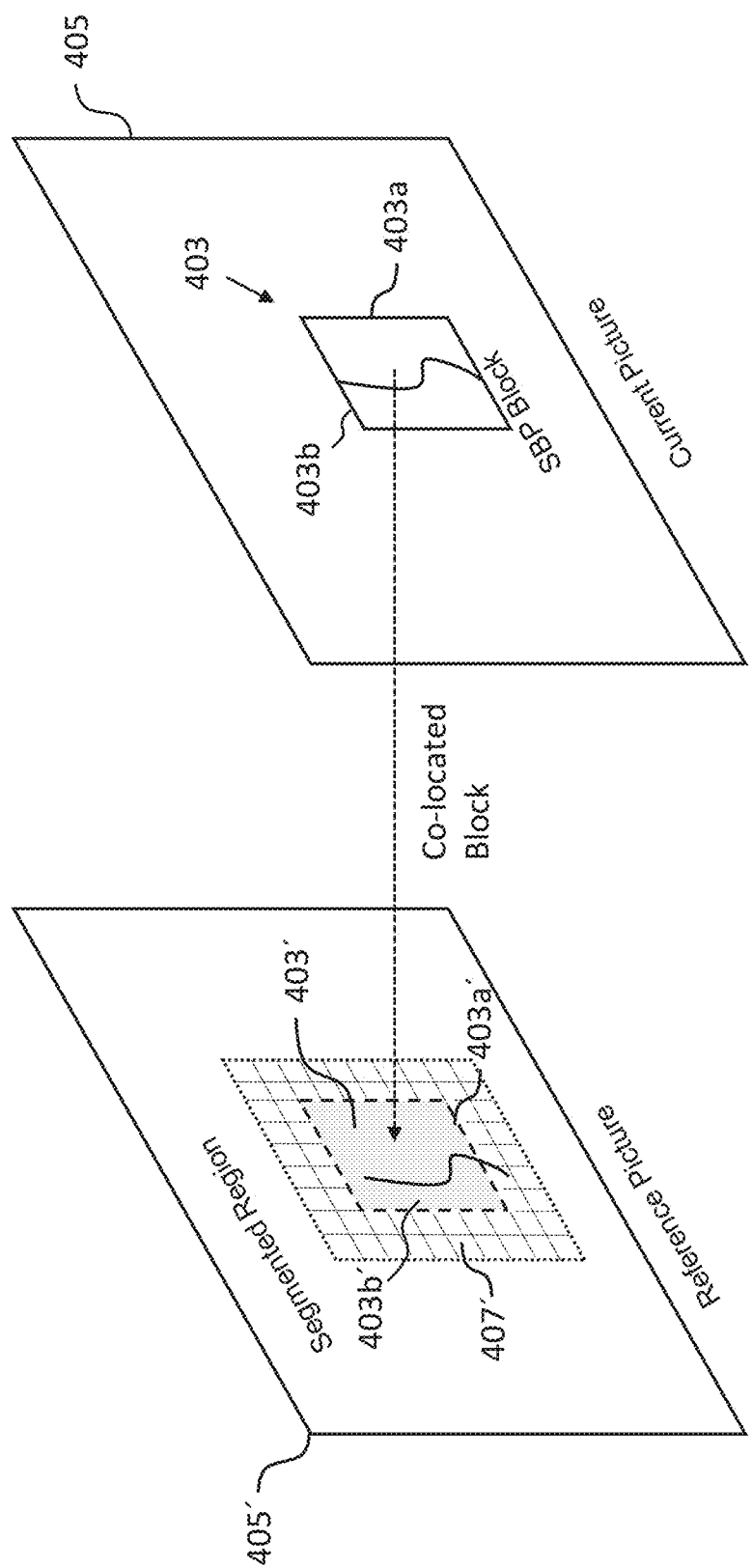
FIG. 4 shows a schematic diagram illustrating different aspects of a segmentation based partitioning approach implemented in embodiments of the invention.

The decoding apparatus 200 comprises a decoding processor 202 configured to decode coding information of a first video coding block 403 of the plurality of video coding blocks in a current frame and side information of an extension region 407' of a co-located block 403' in a reference frame 405' of the video signal, wherein the extension region 407' neighbors the co-located block 403' in the reference frame 405', as indicated in the exemplary scenario shown in FIG. 4. The decoding processor may include an entropy decoding unit 205 and a decoding unit 207.

Moreover, the decoding apparatus 200 comprises a partitioner 221, which in the embodiment shown in FIG. 2 is implemented in the form of a segmentation based partition unit 221. As will be explained in more detail in the context of FIG. 3 below, the segmentation based partition unit 221 of the decoding apparatus 200 can be essentially identical to the segmentation based partition unit 121 of the encoding apparatus 100 shown in FIG. 1. Therefore, it will not be described again in the following. The partitioner 221 of the decoding apparatus 200 is configured to partition the co-located video coding block 403' in the reference frame 405' into a first segment 403a and a second segment 403b based on the received coding information and side information, wherein the first segment 403a comprises a first set of the plurality of pixels of the co-located video coding block 403' and the second segment 403b comprises a second set of the plurality of pixels of the co-located video coding block 403'.

Moreover, the decoding apparatus 200 comprises a reconstruction unit 209 configured to reconstruct the first video coding block based on the decoded coding information, the first segment 403a' and second segment 403b' in the reference frame.

Besides the above described features, the encoder illustrated in FIG. 2 further shows additional components. As will be discussed below. Although these components may be present in a possible implementation of an encoder according to the invention, these are not essential relative to the inventive concepts discussed in this document.

In the embodiment shown in FIG. 2, the entropy decoding unit 205 is configured to perform entropy decoding of the prediction errors, motion data and other side information, which may be used by additional components of the decoding apparatus 200, such as for instance the intra prediction unit 213, the inter prediction unit 215, the segmentation based partition unit 221 and/or the filtering unit 217. The operations of the intra prediction unit 213, the inter prediction unit 215, the segmentation based partition unit 221 and the filtering unit 217 are essentially the same as the operations performed by the corresponding components of the encoding apparatus 100 shown in FIG. 1, namely the intra prediction unit 113, the inter prediction unit 115, the segmentation based partition unit 121 and the filtering unit 117, which already have been described above in the context of FIG. 1. This is to ensure that identical predictions can be generated both by encoding apparatus 100 as well as by the decoding apparatus 200. Specifically, referring to the inter prediction unit 215 of the decoder, a motion vector is decoded and the decoded motion vector is used for motion the compensation process.

Figure 3:
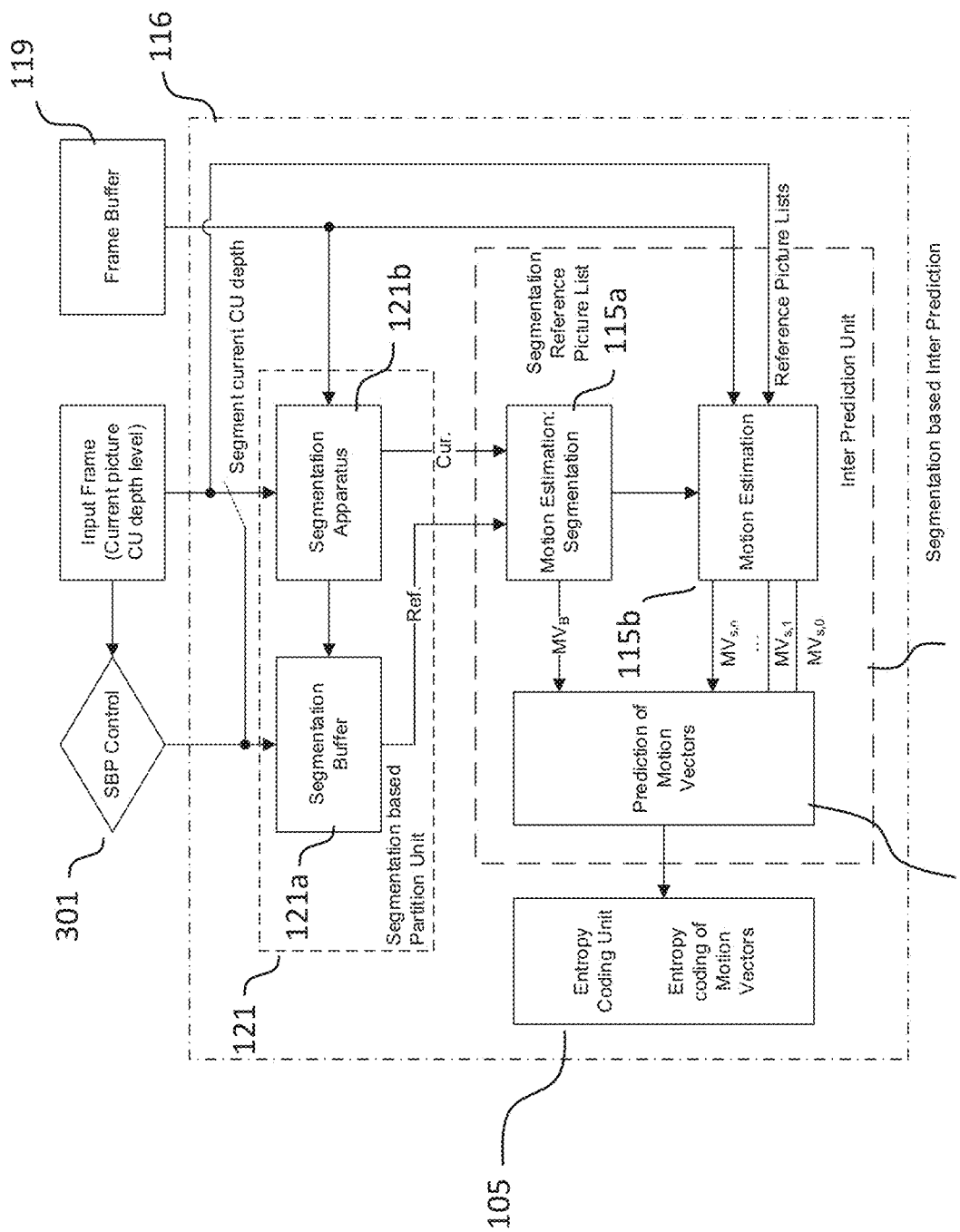
FIG. 3 shows a schematic diagram illustrating a more detailed view of components of the encoding apparatus of FIG. 1 or the decoding apparatus of FIG. 2 according to an embodiment.

FIG. 3 shows a detailed illustration of a possible implementation of the functional blocks of the encoding apparatus 100 and the decoding apparatus 200, which implement the segmentation based partitioning according to embodiments of the invention. In the embodiment shown in FIG. 3, the segmentation based partition unit 121 comprises a segmentation buffer 121a and a segmentation apparatus 121b and the inter prediction unit 115 comprises a block "Motion Estimation: Segmentation" 115a, a block "Motion Estimation" 115b and a block "Prediction of Motion Vectors" 115c. As already mentioned above, these blocks can be implemented in the inter prediction unit 215 and the segmentation based partition unit 221 of the decoding apparatus 200 as well. As one will appreciate, other typical components present in modern hybrid video codecs, such as the transform coding and entropy coding blocks, are not explicitly specified in FIG. 3 for the sake of clarity.

In the embodiment shown in FIG. 3, a SBP control block 301 is configured to determine in a first step whether segmentation is performed for the current coding tree or quad-tree depth level. In an embodiment, the SBP control block 301 is configured to check at a current depth level k whether segmentation shall be performed for all depth levels and whether the depth is not larger than a threshold depth $k_{MaxDepth}$. While in the implementation described in FIG. 3 the SBP control block 301 is depicted as an independent block connected upstream of the segmentation based partition unit 121, the functionality of such block may also be implemented within the segmentation based partition unit 121. In such a case, no independent block needs to be indicated, as for instance illustrated in FIGS. 1 and 2.

If this is the case, then in a second step the picture region associated with the current video coding block can be segmented into a binary mask and stored in a segmentation buffer 121a of the segmentation based partition unit 121. Otherwise, i.e. if one of the conditions checked by the SBP control block 301 is not fulfilled, the segmented picture region associated with depth level k−1 can be loaded from the segmentation buffer 121a and processing continues at step 6 (described later on in the description).

In a third step the segmentation, including all possible steps of pre- and post-processing, can be performed by a segmentation apparatus 121b of the segmentation based partition unit 121. Segmentation related parameters can be transmitted as side-information to the decoding apparatus 200. As described above with reference to the encoding apparatus, side-information may be transmitted to the decoding apparatus 200 in a bitstream along with an encoded video signal. Alternatively, the side information may be coded in the video signal to be transmitted as bitstream to the decoding apparatus 200.

In a fourth step, for every reference picture (or reference frame) belonging to a segmentation reference picture list, which is associated with the current picture (or frame), a boundary motion vector $MV_b$ can be estimated according to the following steps 5 and 6. In an embodiment, the displacement vector $MV_b$ can be selected on the basis of a rate-distortion cost criterion.

In a fifth step, a picture region of a reference picture at the co-located position of the currently processed video coding block is analyzed, where the size of the picture region can depend on a configurable search window size and the size of the currently processed video coding block. The picture region is segmented according to above step 3.

In a sixth step, motion estimation can be performed for the current segmented picture region and the segmented reference picture region by the motion estimation blocks 115a and 115b. As an example, the "motion estimation: segmentation block" 115a determines the boundary displacement vector $MV_b$.

In a seventh step, steps 5 and 6 can be repeated for all reference pictures in the reference picture list. After the optimal displacement vector has been found, the segmented reference picture region can be motion compensated using the boundary displacement vector and stored in the segmentation buffer 121a of the segmentation based partition unit 121. The selected segmentation reference picture can be associated with a reference picture index, which is being transmitted as side information to the decoding apparatus 200.

In an eighth step, a segment-wise motion estimation can be performed on the currently processed video coding block using the compensated, segmentation mask for each of the segments, resulting in one motion vector per segment. Motion estimation can be performed in a uni- and bi-directional manner as well as using a weighted prediction scheme.

In a ninth step, the motion vectors of the segments can be predicted. And finally, the boundary motion vector can be predicted.

FIG. 4, which has already been referred to further above, illustrates different aspects of a segmentation based partitioning approach implemented in embodiments of the invention, in particular in the encoding apparatus 100 shown in FIG. 1 and the decoding apparatus 200 shown in FIG. 2. The segmentation based partitioning approach implemented in embodiments of the invention is based on the idea to extend the sampling region of a currently processed video coding block 403 by using additional samples, i.e. pixels from an extension region 407' defined by neighboring video coding blocks. On the basis of this larger sampling space the segmentation result can be stabilized, i.e. the position of the segments can be estimated more precisely. This is especially advantageous, when the currently processed video coding block 403 is of small size and the video coding block refers to a (fast) moving scene, i.e. movement is observed in the video coding block. As shown in FIG. 4, the extension region 407' can be defined outside of the co-located video coding block 403' in a reference picture 405'. Additionally or alternatively, the extension region can be defined outside of the currently processed video coding block 403 in the currently processed frame 405.

The use of sample pixels from an extension region 407, 407' outside of the currently processed and/or co-located video coding block 403, 403', which may extend into neighboring video coding blocks (CUs and/or CTUs), can be considered as using a sliding window during the segmentation process, thus minimizing strong edges in the segmented reference pictures at the video coding block boundaries.

In order to be able to perform, for instance, inter prediction several reference pictures are generally kept in the frame buffer 119, 219 of the encoding apparatus shown in FIG. 1 and the decoding apparatus 200 shown in FIG. 2. Accessing pixels can be performed block wise, where the address, i.e. position, of the reference block within the reference picture is determined from the co-located position and offset with a motion vector. For using an extension region for segmentation based partitioning, as implemented in embodiments of the invention, a similar approach can be used, where segmentation is always performed on a co-located region within a selected reference picture.

In an embodiment, the input to the segmentation apparatus 121*b* shown in FIG. 3, as implemented in the encoding apparatus 100, is an array of pixels containing the pixels of the currently processed video coding block 403, which define a set of pixels C, as well as additional pixels from neighboring video coding blocks, which belong to the extension region 407 and define a set of pixels E. Thus, the resulting block representing the input to the segmentation apparatus 121*b* can be denoted as a set B, wherein B=C∪E. In an embodiment, the dimensions of the block 403 are a fixed value, whereas the dimensions of the extension region 407, 407' are configurable. A larger extension region gives more weight to the pixels being further away.

In an embodiment, preprocessing may be applied to the pixels from the video coding block 403, 403' and/or the extension region 407, 407' of the video coding block, for instance, low pass or median filtering. In an embodiment, two configurable sampling grids are applied to the array of pixels. One sampling grid is applied to the extension region 407, 407', the other is applied to the (currently processed or co-located) video coding block 403, 403'. The sampling density defined by the sampling grid applied to the extension region 407, 407' can be identical to or differ from the sampling density defined by the sampling grid applied to the video coding block 403, 403'.

The sampling grids applied to the video coding block 403, 403' and the extension region 407, 407' can be generated using sampling matrices $D_1$ and $D_2$, such as:

$$s_i(x,y) = D_i [x \ y]^T,$$

wherein $s_i$, i=1, 2 denotes the sampling positions in x and y directions for the video coding block 403, 403' and the sampling positions in x and y directions for the extension region 407, 407'. $D_i$ is a non-unique matrix characterizing the sampling process and used in the art for generating sampling lattices in the video frame and may be arbitrary.

In order to have matching segmentations at the encoding apparatus 100 and the decoding apparatus 200, the sampling matrices $D_1$ and $D_2$ used by the encoding apparatus 100 should be known at the decoding apparatus 200 as well. In an embodiment, this can be achieved by explicitly signaling the sampling configuration, such as the sampling matrices $D_1$ and $D_2$, to the decoding apparatus 200 or by using a preset value that has been determined suitable.

Figure 5:
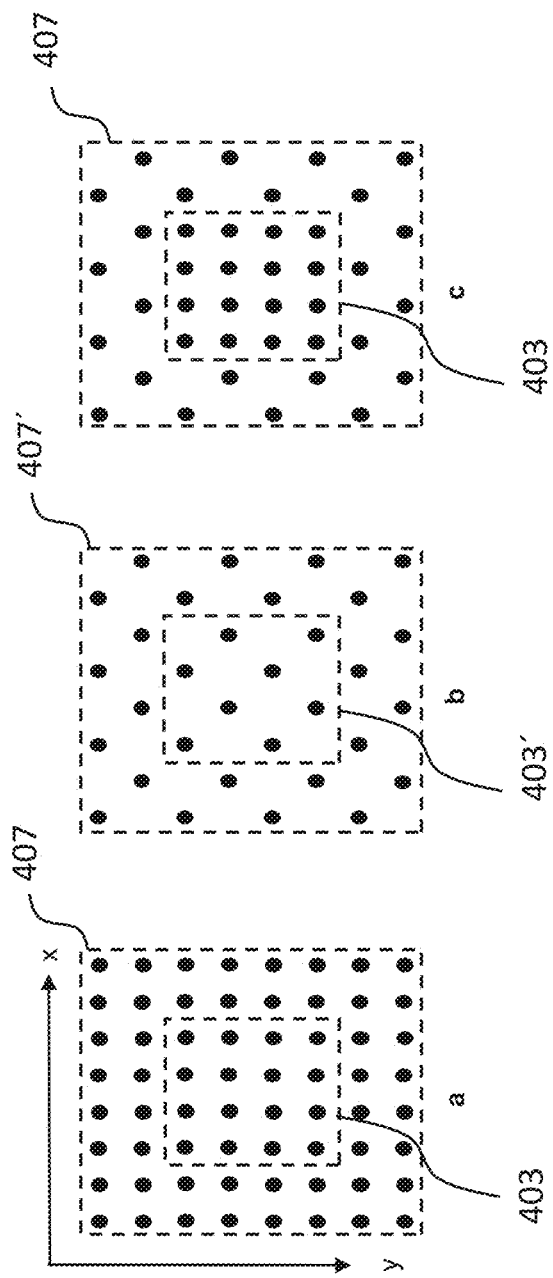
FIG. 5 shows a schematic diagram illustrating different aspects of a segmentation based partitioning approach implemented in embodiments of the invention.

As can be taken from FIG. 5, according to embodiments of the invention the sampling configuration, in particular the sampling density, can be the same for the video coding block 403, 403' and the extension region 407, 407' or can differ for the video coding block 403, 403' and the extension region 407, 407'. In the example shown in FIG. 5*a*, the sampling density used in the video coding block 403 is identical to the sampling density used in the extension region 407. In the example shown in FIG. 5*b*, the sampling density used in the co-located video coding block 403' is identical to the sampling density used in the extension region 407' as well, but the sampling density is smaller than the sampling density used in the example shown in FIG. 5*a*. In the example shown in FIG. 5*c*, the sampling density used in the video coding block 403 is larger than the sampling density used in the extension region 407.

The motivation behind using different sampling densities in the extension region 407, 407' and the video coding block 403, 403' is to have higher flexibility in the segmentation process. In an embodiment, the segmentation process can be adapted to the size of the video coding block by changing the size of the extension region and/or the sampling density accordingly.

In an embodiment, a set of predefined rules can be implemented, which specify the sampling density and the size of the extension region 407, 407' as a function of the size of the video coding block 403. A possible implementation could specify that a frame-shaped extension region 407, 407' is applied around the currently processed video coding block 403 with the following sampling densities and sizes of the extension regions in both directions.

A uniform subsampling, as shown in FIG. 5*b*, is applied in the extension region 407' and the video coding block 403' for all blocks of size larger than or equal to 32×32 pixels with a varying size of the extension region. For blocks larger than 64×64 pixels no extension region is chosen. For a video coding block 403, 403' of size 64×64 pixels an extension region 407, 407' having a width of 8 pixels can be chosen. For a video coding block 403, 403' of size 32×32 pixels an extension region 407, 407' having a width of 16 pixels can be chosen.

For a non-uniform sampling, as shown in FIG. 5*c*, with a higher sampling density for the video coding block 403, 403' than for the extension region 407, 407', the extension region 407, 407' can be chosen to have a width of 8 pixels for a video coding block 403, 403' of size 16×16 pixels. For a video coding block 403, 403' of size 8×8 pixels an extension region 407, 407' having a width of 16 pixels can be chosen.

In an embodiment, further criteria can be taken into account for adapting the sampling density within the extension region 407, 407' and/or the size of the extension region 407, 407', such as the amount of movement observed during pre-analysis of a currently processed picture or frame or indicated by the motion vectors of neighboring video coding blocks.

Figure 6:
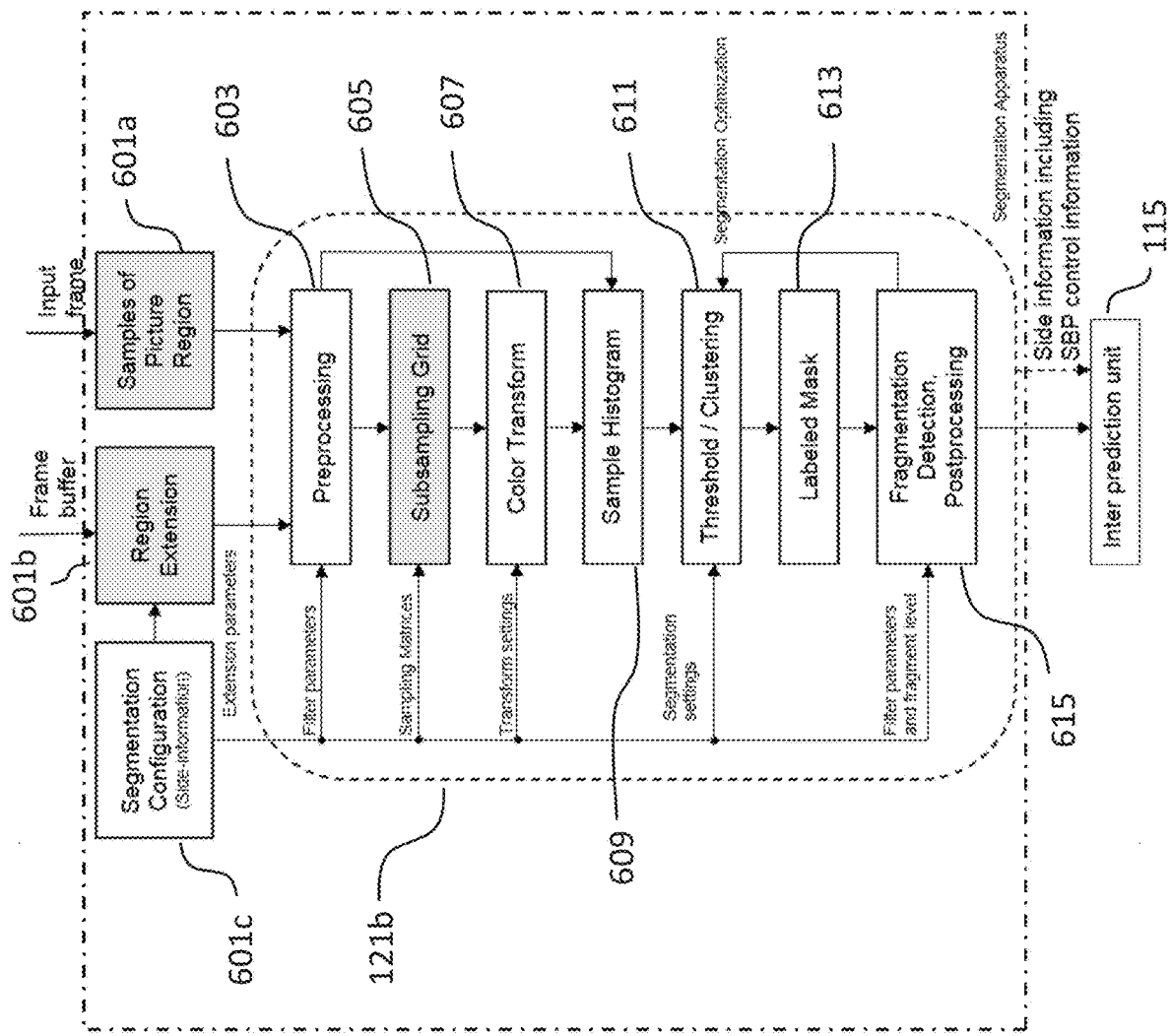
FIG. 6 shows a schematic diagram illustrating a more detailed view of a segmentation apparatus, which according to an embodiment can be implemented in the encoding apparatus of FIG. 1 or the decoding apparatus of FIG. 2.

FIG. 6 shows a schematic diagram illustrating a more detailed view of an embodiment of the segmentation apparatus 121*b* of the segmentation based partition unit 121 shown in FIG. 3, which can be implemented in the encoding apparatus of FIG. 1 or the decoding apparatus of FIG. 2. Thus, FIG. 6 illustrates the relative position of the extension region scheme and subsampling of the input image data in the processing chain. In an embodiment, sampling of the extended region 407, 407' (blocks 601*a-c*, 603 and 605 of FIG. 6) is performed ahead of other processing steps such as color transforms (block 607 of FIG. 6), thereby reducing complexity of the subsequent steps. In an embodiment, blocks 609 and 611 can implement a segmentation method known as "Otsu's Thresholding", which can minimize intra-class variance while maximizing inter-class variance of respective features, such as luminance. In an embodiment, a histogram of sample values can be used.

Block 613 of FIG. 6 denotes the process of mask labeling, e.g. assigning an index to each pixel according to its determined class. For two segments—two classes—indices 0 and 1 could be used in a possible implementation. This binary or 8 bit integer representation in case of more than two segments allows low memory storage of the segmentation mask(s).

Block 615 of FIG. 6 performs a validity check of the segmentation result. Fragmentation of the segmentation can be detected by connected-component labeling, where the number of isolated, compact regions sharing the same label index are counted. Based on the fragmentation count, a segmentation optimization can be performed or this information can be used to skip the motion estimation at this early stage, when no relevant segmentation can be performed.

Figure 7:
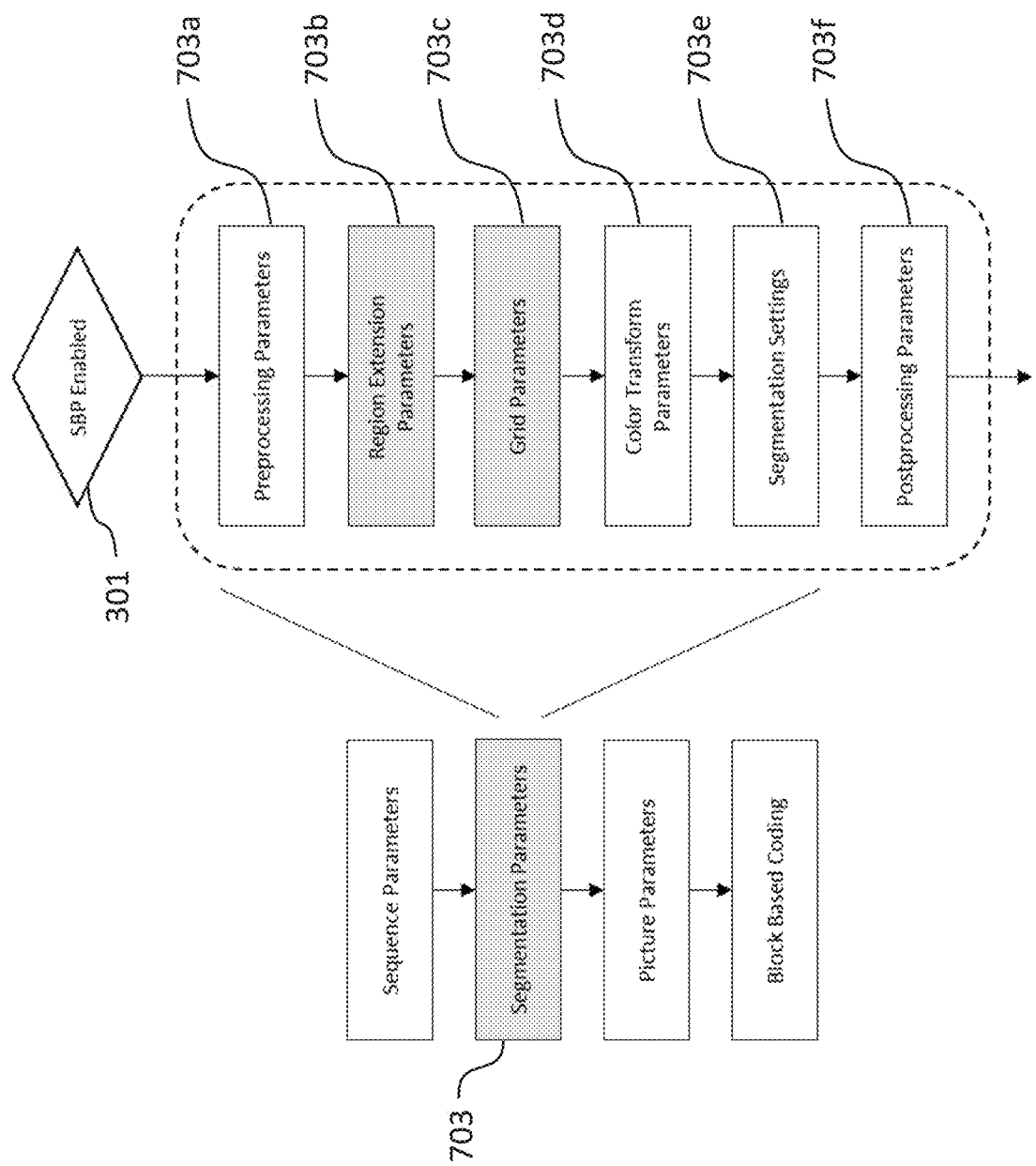
FIG. 7 shows a schematic diagram illustrating different aspects of a segmentation based partitioning approach implemented in embodiments of the invention.

As already mentioned above, the parameters used for the extension region(s) 407, 407' and the sampling densities can be determined either by the encoding apparatus 100 or set to a fixed value, which has been determined by other means. If the first option is chosen, the parameters can be transmitted as side-information to the decoding apparatus 200 according to one of the transmission schemes described above. FIG. 7 shows a possible way of coding these parameters, such as the region extension parameters 703b and the grid, i.e. sampling parameters 703c, on the sequence level for a video stream as part of other segmentation related parameters 703, such as preprocessing parameters 703a, color transform parameters 703d, segmentation settings 703e and post-processing parameters 703f. Other implementations are also possible, e.g. coding this information on a picture or block level.

Figure 8:
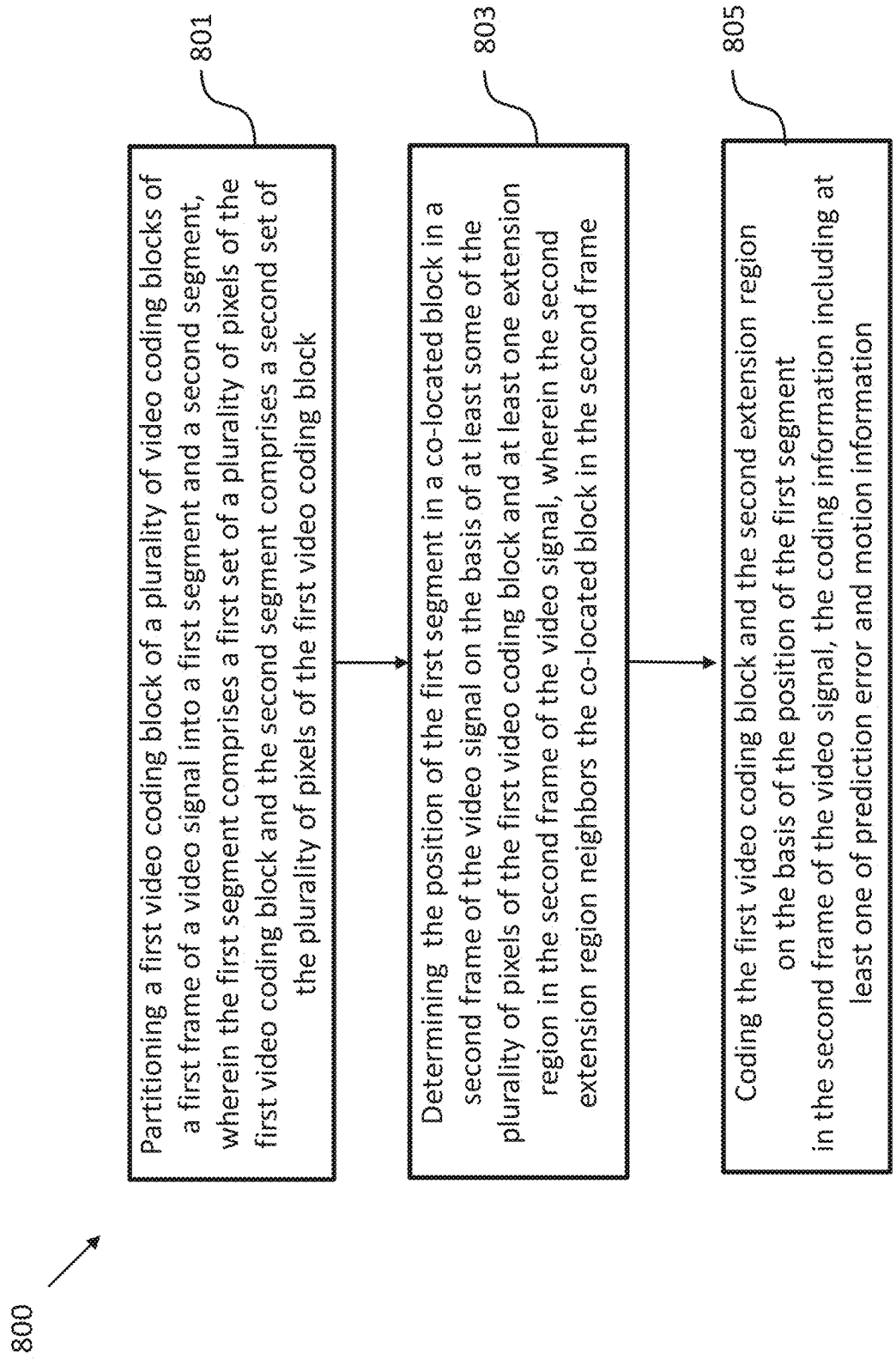
FIG. 8 shows a schematic diagram of a method for encoding a video signal according to an embodiment.

FIG. 8 shows a schematic diagram of a method 800 for processing a video signal according to an embodiment. In particular, FIG. 8 illustrates a method for encoding a video signal.

The method 800 comprises a first step 801 of partitioning a first video coding block 403 of the plurality of video coding blocks of a first frame 405 of the video signal into a first segment 403a and a second segment 403b, wherein the first segment 403a comprises a first set of the plurality of pixels of the first video coding block 403 and the second segment 403b comprises a second set of the plurality of pixels of the first video coding block 403.

The method 800 comprises a further step 803 of determining the position of the first segment 403a in a co-located block 403' in a second frame 405' of the video signal on the basis of at least some of the plurality of pixels of the first video coding block 403 and at least one extension region 407' in the second frame 405' of the video signal, wherein the extension region 407' neighbors the co-located block 403' in the second frame 405'.

The method 800 comprises a further step 805 of coding the first video coding block 403 and the extension region 407' on the basis of the position of the first segment 403a in the second frame 405' of the video signal, the coding information including at least one of prediction error and motion information.

Figure 9:
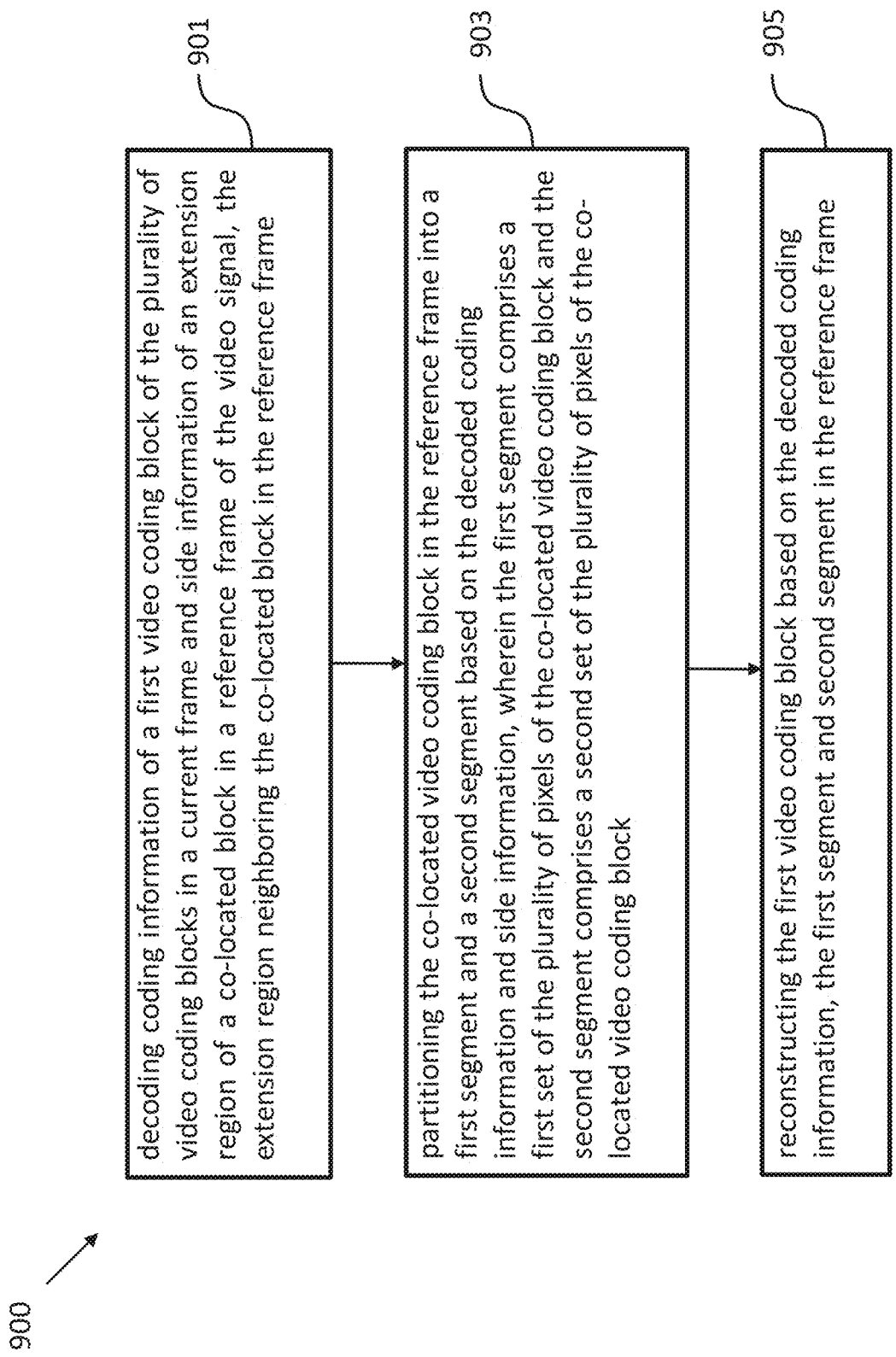
FIG. 9 shows a schematic diagram of a method for decoding a video signal according to an embodiment.

FIG. 9 shows a schematic diagram of a method for processing a video signal according to an embodiment. In particular, FIG. 9 illustrates a method for decoding a video signal.

The method 900 comprises a first step 901 of decoding coding information of a first video coding block 403 of the plurality of video coding blocks in a current frame and side information of an extension region 407' of a co-located block 403' in a reference frame 405' of the video signal. The extension region 407' neighbors the co-located block 403' in the reference frame 405'.

In a second step 903, the co-located video coding block 403' in the reference frame 405' is partitioned into a first segment 403a' and a second segment 403b' based on the decoded coding information and side information. The first segment 403a' comprises a first set of the plurality of pixels of the co-located video coding block 403' and the second segment 403b' comprises a second set of the plurality of pixels of the co-located video coding block 403'.

In a third step 905, the first video coding block 403 is reconstructed on the basis of the received coding information, the first segment 403a' and second segment 403b' in the reference frame.

An analysis has been performed, measuring the usage of the SBP mode in the current software implementation based on HM-14-KTA-1.0 depending on the size of the extended support region around the current block. The subsampling configuration tested on the current picture region and extended picture region is similar to the one shown in FIG. 5c, where a denser sampling is performed on the pixels associated with the current block. The extended picture region tested is a symmetric square around the current block, chosen for its low complexity in calculating sampling positions.

The SBP mode usage was measured as the area of all SBP blocks divided by the total area per picture. The following detailed configuration was used.

SBP Specific Settings:
Extended picture region subsampling matrix DE=[2,0; 0,2], e.g. subsampling by factor of 2 in each dimension
Current picture region subsampling matrix DC=[1, 0; 0, 1], e.g. no subsampling on the current block
Segmentation by adaptive thresholding on luminance component
Postprocessing by 3×3 median kernel and 1 iteration if closing Tested Support Regions:
No support region as reference
8 pixels (px) in all directions
16px in all directions
32px in all directions KTA Specific Settings:
Max CU size: 128×128
OBMC off
Sub-PU-TMVP off
EMT on
64×64 transform on
Lowdelay Mode, tested QPs: 22, 27, 32, 37

The test results are shown in the following table.

| Sequence | Increase of SBP mode usage in [%] for region extension size | | |
|---|---|---|---|
| | 8 px | 16 px | 32 px |
| BasketballPass | 7.18 | 3.30 | 1.52 |
| RaceHorses | 1.40 | 7.84 | 7.53 |
| BQSquare | 3.39 | 5.61 | 0.15 |

The experimental results demonstrate that the proposed region extension method to SBP can help to increase the usage of SBP mode. With the present invention, the stabilization and accuracy of the segmentation algorithm can be significantly improved.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. An encoding apparatus for processing a video signal, the video signal comprising a plurality of frames, each frame being dividable into a plurality of video coding blocks, each video coding block comprising a plurality of pixels, the encoding apparatus comprising:
    a partitioner configured to partition a first video coding block of the plurality of video coding blocks of a first frame of the video signal into a first segment and a second segment, wherein the first segment comprises a first set of the plurality of pixels of the first video coding block and the second segment comprises a second set of the plurality of pixels of the first video coding block;
    a determiner configured to determine a position of the first segment in a co-located block in a second frame of the video signal on the basis of at least some of the plurality of pixels of the first video coding block and at least one extension region in the second frame of the video signal, wherein the extension region neighbors the co-located block in the second frame; and
    an encoding processor configured to code coding information of the first video coding block and side information of the extension region on the basis of the position of the first segment in the second frame of the video signal, the coding information including at least one of prediction error and motion information,
    wherein the extension region is a subset of one or more video coding blocks neighboring the co-located coding block in the second frame, and
    wherein the determiner is configured to adjust an extension region width of the extension region based on a size of the first video coding block.

2. The encoding apparatus of claim 1, wherein the determiner is configured to increase the extension region width in case the number of pixels of the first video coding block decreases.

3. The encoding apparatus of claim 2, wherein the determiner is configured to adjust the extension region width to 16 pixels in case the first video coding block comprises 32×32 pixels or to adjust the extension region width to 8 pixels in case the first video coding block comprises 64×64 pixels.

4. The encoding apparatus of claim 2, wherein the determiner is configured to adjust the extension region width to 16 pixels in case the first video coding block comprises 8×8 pixels or to adjust the extension region width to 8 pixels in case the first video coding block comprises 16×16 pixels.

5. The encoding apparatus of claim 1, wherein the determiner is configured to determine a position of the first segment in the second frame of the video signal on the basis of at least some of the plurality of pixels of the first video coding block sampled using a first sampling density and at least some of a plurality of pixels of the extension region using a second sampling density, wherein the first sampling density and/or the second sampling density depends on the size of the first video coding block.

6. The encoding apparatus of claim 5, wherein the determiner is configured to increase the first sampling density in case the number of pixels of the first video coding block decreases.

7. The encoding apparatus of claim 5, wherein the first sampling density is larger than the second sampling density.

8. The encoding apparatus of claim 1, wherein the side information includes at least one of a shape of the extension region, a size of the extension region and a sampling pattern, said side information being received on one of a coding block level, slice level, picture level and sequence level.

9. A decoding apparatus for processing a video signal, the video signal comprising a plurality of frames, each frame being dividable into a plurality of video coding blocks, each video coding block comprising a plurality of pixels, the decoding apparatus comprising:
    a decoding processor configured to decode coding information of a first video coding block of the plurality of video coding blocks in a current frame and side information of an extension region of a co-located block in a reference frame of the video signal, the extension region neighboring the co-located block in the reference frame;
    a partitioner configured to partition the co-located video coding block in the reference frame into a first segment and a second segment based on the decoded coding information and side information, wherein the first segment comprises a first set of the plurality of pixels of the co-located video coding block and the second segment comprises a second set of the plurality of pixels of the co-located video coding block; and
    a reconstruction unit configured to reconstruct the first video coding block based on the decoded coding information, the first segment and second segment in the reference frame,
    wherein the extension region is a subset of one or more video coding blocks neighboring the co-located coding block in the second frame, and
    wherein the side information includes:
        a size of the extension region including an extension region width, where the extension region width is adjusted based on a size of the first video coding block; and
        at least one of a shape of the extension region and a sampling pattern, and
    wherein the side information being received on one of a coding block level, a slice level, a picture level and a sequence level.

10. The decoding apparatus of claim 9, wherein the side information is context based adaptive binary arithmetic coded, the context being defined by side information of at least one neighboring block.

11. A method for processing a video signal, the video signal comprising a plurality of frames, each frame being dividable into a plurality of video coding blocks, each video coding block comprising a plurality of pixels, the method comprising:
  partitioning a first video coding block of the plurality of video coding blocks of a first frame of the video signal into a first segment and a second segment, wherein the first segment comprises a first set of the plurality of pixels of the first video coding block and the second segment comprises a second set of the plurality of pixels of the first video coding block;
  determining a position of the first segment in a co-located block in a second frame of the video signal on the basis of at least some of the plurality of pixels of the first video coding block and at least one extension region in the second frame of the video signal, wherein the extension region neighbors the co-located block in the second frame;
  adjusting an extension region width of the extension region based on a size of the first video coding block, wherein the extension region is a subset of one or more video coding blocks neighboring the co-located coding block in the second frame; and
  coding coding information of the first video coding block and side information of the extension region on the basis of the position of the first segment in the second frame of the video signal, the coding information including at least one of prediction error and motion information.

12. A method for processing a video signal, the video signal comprising a plurality of frames, each frame being dividable into a plurality of video coding blocks, each video coding block comprising a plurality of pixels, the method comprising:
  decoding coding information of a first video coding block of the plurality of video coding blocks in a current frame and side information of an extension region of a co-located block in a reference frame of the video signal, the extension region neighboring the co-located block in the reference frame;
  partitioning the co-located video coding block in the reference frame into a first segment and a second segment based on the decoded coding information and side information, wherein the first segment comprises a first set of the plurality of pixels of the co-located video coding block and the second segment comprises a second set of the plurality of pixels of the co-located video coding block; and
  reconstructing the first video coding block based on the decoded coding information, the first segment and second segment in the reference frame,
  wherein the extension region is a subset of one or more video coding blocks neighboring the co-located coding block in the second frame, and
  wherein the side information includes:
    a size of the extension region including an extension region width, where the extension region width is adjusted based on a size of the first video coding block; and
    at least one of a shape of the extension region and a sampling pattern, and
  wherein the side information being received on one of a coding block level, a slice level, a picture level and a sequence level.

13. A non-transitory computer readable storage medium for processing a video signal, the video signal comprising a plurality of frames, each frame being dividable into a plurality of video coding blocks, each video coding block comprising a plurality of pixels, the non-transitory computer readable storage medium storing instructions that when executed by a computer configure the computer to:
  partition a first video coding block of the plurality of video coding blocks of a first frame of the video signal into a first segment and a second segment, wherein the first segment comprises a first set of the plurality of pixels of the first video coding block and the second segment comprises a second set of the plurality of pixels of the first video coding block;
  determine a position of the first segment in a co-located block in a second frame of the video signal on the basis of at least some of the plurality of pixels of the first video coding block and at least one extension region in the second frame of the video signal, wherein the extension region neighbors the co-located block in the second frame;
  adjust an extension region width of the extension region based on a size of the first video coding block, wherein the extension region is a subset of one or more video coding blocks neighboring the co-located coding block in the second frame; and
  code coding information of the first video coding block and side information of the extension region on the basis of the position of the first segment in the second frame of the video signal, the coding information including at least one of prediction error and motion information.

* * * * *